US011978227B2

(12) United States Patent
Holland

(10) Patent No.: US 11,978,227 B2
(45) Date of Patent: May 7, 2024

(54) SYSTEMS AND METHODS FOR FOREST SURVEYING

(71) Applicant: Forest Carbon Works, PBC, Minneapolis, MN (US)

(72) Inventor: Kyle Andrew Holland, Plymouth, MN (US)

(73) Assignee: FOREST CARBON WORKS, PBC, Minneapolis, MN (US)

(*) Notice: Subject to any disclaimer, the term of this patent is extended or adjusted under 35 U.S.C. 154(b) by 371 days.

(21) Appl. No.: 17/406,398

(22) Filed: Aug. 19, 2021

(65) Prior Publication Data

US 2023/0059652 A1 Feb. 23, 2023

(51) Int. Cl.
| | |
|---|---|
| *G06T 7/60* | (2017.01) |
| *G01C 15/00* | (2006.01) |
| *G01S 17/08* | (2006.01) |
| *G03B 17/56* | (2021.01) |
| *G06T 7/80* | (2017.01) |

(52) U.S. Cl.
CPC .............. *G06T 7/60* (2013.01); *G01C 15/008* (2013.01); *G01S 17/08* (2013.01); *G03B 17/561* (2013.01); *G06T 7/80* (2017.01); *G06T 2207/30188* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,738,148 | B2 | 5/2004 | Dunne et al. |
| 6,792,684 | B1 | 9/2004 | Hyyppa |
| 7,212,670 | B1 | 5/2007 | Rousselle et al. |
| 7,639,842 | B2 | 12/2009 | Kelle et al. |
| 10,402,676 | B2 * | 9/2019 | Wang ..................... G06V 10/44 |
| 10,467,475 | B2 | 11/2019 | Parisa |

(Continued)

FOREIGN PATENT DOCUMENTS

| | | |
|---|---|---|
| CN | 110162872 A | 8/2019 |
| CN | 110823813 A | 2/2020 |
| WO | 03069315 A1 | 8/2003 |

OTHER PUBLICATIONS

Xiang, Tian-Zhu, Gui-Song Xia, and Liangpei Zhang. "Mini-unmanned aerial vehicle-based remote sensing: Techniques, applications, and prospects." IEEE geoscience and remote sensing magazine 7.3 (2019): 29-63. (Year: 2019).*

*Primary Examiner* — Michelle M Entezari Hausmann
(74) *Attorney, Agent, or Firm* — Fredrikson & Byron, P.A.

(57) ABSTRACT

A system for determining a length of an object includes a rod, an imaging device couplable to the rod, a laser rangefinder, one or more sensors, and a processor. The processor can receive image data, the orientation of the rod relative to the surface, and the distance to the surface from the imaging device and can determine the length of the rod. A system for surveying trees within a plot includes an imaging device, one or more sensors for measuring at least one of a pitch, a roll, or a compass bearing of the imaging device, and one or more processors configured to receive images of the plot including trees within the plot, associate one or more sensor measurements with the images, store the images with their associated measurements, and generate a survey of trees in the plot using at least the images and the one or more sensor measurements.

9 Claims, 10 Drawing Sheets

(56) References Cited

U.S. PATENT DOCUMENTS

| | | |
|---|---|---|
| 2008/0046184 A1 | 2/2008 | Bortolot et al. |
| 2018/0259652 A1* | 9/2018 | Shimizu .................... G06T 7/70 |
| 2018/0315221 A1* | 11/2018 | Jones ...................... G06F 18/22 |
| 2018/0339387 A1* | 11/2018 | Kahle .................... G01C 15/06 |
| 2020/0066034 A1* | 2/2020 | Tham .................... G05D 1/0016 |
| 2021/0011137 A1 | 1/2021 | Bronner |
| 2021/0360880 A1* | 11/2021 | Oinonen ............. G01B 5/0035 |
| 2022/0043154 A1* | 2/2022 | Hey ........................ G01S 17/89 |
| 2023/0123749 A1* | 4/2023 | Österberg ............ G06F 18/214 |
| | | 345/419 |

* cited by examiner

SYSTEMS AND METHODS FOR FOREST SURVEYING

BACKGROUND

Forestry management is a branch of forestry that includes many different aspects. These aspects may include environmental, economic, administrative, legal, and social aspects of managing a forest. Forestry management may consist of various techniques such as timber extraction, planting trees, replanting trees, cutting roads and pathways through forests, preventing fires in a forest, maintaining the health of the forest, and other suitable activities.

When performing these and other operations with respect to forest management, collecting information about the forest may be desired. For example, collecting information about the forest provides an ability to analyze the state of the forest as well as identify operations that may be performed. These operations may include, for example, at least one of replanting trees, harvesting trees, thinning the forest to improve growth, applying fertilizer, performing pest removal, generating warnings of potential fire conditions, initiating fire risk reduction activities, removing dead wood, reducing forest floor undergrowth, performing timber improvement activities, and other suitable operations.

It may be helpful in forestry management to develop a forest resource inventory which may include specific information about the trees within the forest. One such method of developing a forest resource inventory includes conducting timber cruises. Timber cruises systematically sample individual plots of a forest and extrapolate the characteristics of the plots to the rest of the forest. Timber cruises can assess the quantity and quality of trees within a forest However, while they can be fairly accurate, timber cruises usually need to be performed by a trained professional and require an extensive amount of time and monetary resources to complete, especially for larger forests.

SUMMARY

In one aspect of the present disclosure, a system for surveying trees within a plot is disclosed. The system can reduce the time, among other things, to generate a survey of trees within the plot. The plot includes a series of positions including a monument position, a start stick position, and at least one satellite position. The system comprises an imaging device configured to capture images of a scene and one or more sensors couplable to the imaging device and configured to measure at least one of a pitch, a roll, or a compass bearing and used to determine a pose of the imaging device relative to a surface. The system also comprises one or more processors configured to receive an image of the start stick from the imaging device with the image including the start stick from the monument position. The one or more processors are also configured to receive a first series of images with the first series of images being captured from the monument position and with each image in the first series of images including the bole of a different tree within the plot. The one or more processors are further configured to receive, for each bole of a tree included in the first series of images, a first image capture from a satellite position with the first image including the start stick, and a second image captured from the satellite position with the second image including the bole of a corresponding tree included in the first series of images. The satellite position can lie outside of a line between the corresponding tree included in the first series of images and the monument position. The one or more processors are also configured to associate one or more sensor measurements with the image of the start stick, the first series of images, and the first and second images captured from the satellite position with the one or more sensor measurements comprising the pose of the imaging device when the imaging device generates images of the scene. The one or more processors are further configured to generate a survey of trees in the plot using the image of the start stick, the first series of images, the first and second images captured from the satellite position, and their one or more associated sensor measurements.

In another aspect of the present disclosure, a system for determining a length of an object is disclosed. The system can be used with the system for surveying trees to increase accuracy of measurements. The system comprises a rod having a top end, a bottom end, and a length, an imaging device couplable to the rod, and a laser rangefinder couplable to the imaging device and/or the rod to be supported by the imaging device and/or the rod. The laser rangefinder can be configured to measure a distance to a target. The system also comprises one or more sensors couplable to the rod, the imaging device, and/or the laser rangefinder with the one or more sensors configured to measure at least one of a pitch, a roll, or a compass bearing which are used to determine an orientation of the rod relative to a surface when the bottom end of the rod bears against the surface. The system further comprises a processor in communication with the imaging device, the laser rangefinder, and the one or more sensors. The processor, when the bottom end of the rod bears against the surface, can be configured to receive image data from the imaging device, receive the orientation of the rod relative to the surface, receive the distance to the surface from the laser rangefinder when the surface is the target, and determine the length of the rod using the orientation of the rod relative to the surface and the distance to the surface.

In another aspect of the present disclosure, a system for determining one or more characteristics of one or more trees in a plot is disclosed. The system comprises an imaging device configured to generate image data of the plot and one or more sensors couplable to the imaging device and configured to measure at least one of a pitch, a roll, or a compass bearing for determining a orientation of the imaging device relative to a ground surface. The system also comprises one or more processors in communication with the imaging device and the laser rangefinder with the one or more processors configured to receive a first image from the imaging device with the first image including the one or more trees located within the plot. The one or more processors are also configured to receive a first position and a first orientation of the imaging device and receive a first distance from the laser rangefinder with the first distance being between the one or more trees and the laser rangefinder while the imaging device is in the first position. The one or more processors are further configured to receive a second image from the imaging device with the second image including the one or more trees located within the plot, receive a second position and a second orientation of the imaging device, and receive a second distance from the laser rangefinder. The second distance is between the one or more trees and the laser rangefinder while the imaging device is in the second position. The one or more processors can also be configured to store the first image, the first position, the first orientation, the first distance, the second image, the second position, the second orientation, and the second distance on a computer readable storage medium, and determine one or more characteristics of the one or more trees in the plot using at least one of the first image, the first position, the first orientation, or the first distance and at least one of the second image, the second position, the second orientation, or the second distance.

BRIEF DESCRIPTION OF DRAWINGS

The following drawings are illustrative of particular embodiments of the invention and therefore do not limit the scope of the invention. The drawings are not necessarily to scale (unless so stated) and are intended for use with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Those skilled in the art will recognize that many of the noted examples have a variety of suitable alternatives.

Figure 1:
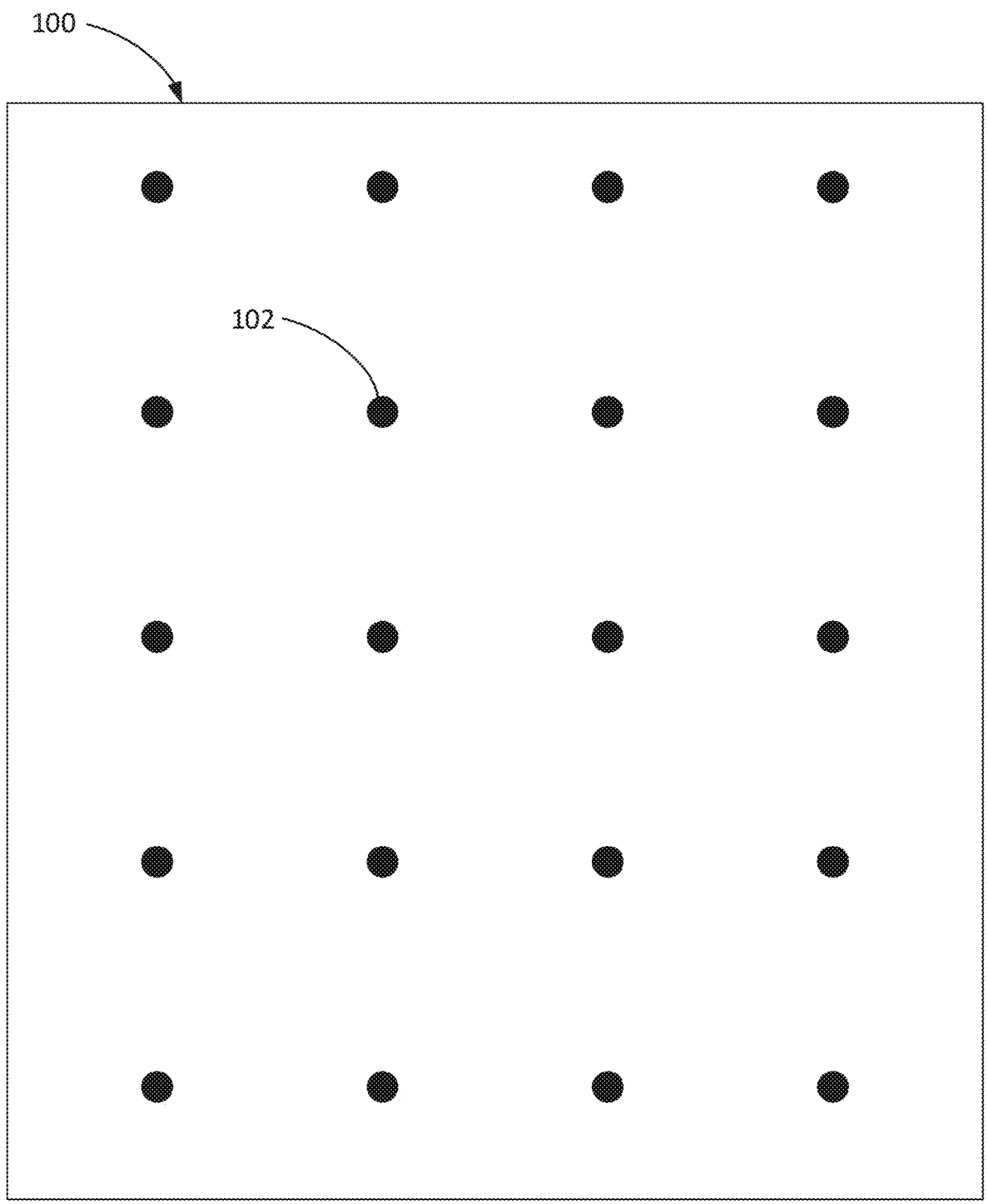
FIG. 1 illustrates a forest survey plot according to an embodiment of the present disclosure.

FIG. 1 illustrates a forest survey plot according to an embodiment of the present disclosure. The forest survey plot 100 includes a boundary of a forest or plot of land to be measured and includes individual plots 102 within the forest. As illustrated, the individual plots 102 within the overall forest survey plot 100 can be distributed systematically in a grid-like fashion such as in a line plot survey. However, different plotting strategies may also be used. The forest survey plot 100 can be used to map characteristics of the forest within the plot such as quantity of trees, the species of trees, the growth of the forest, the amount of harvestable lumber, and other characteristics.

Traditionally, a forest surveyor goes to each of the individual plots 102 within the forest survey plot and measures/determines aspects of each tree within the individual plot 102. For example, a forest surveyor may count the number of trees, determine the species of each tree, measure the diameter at breast height (DBH) of the trees, measure the height of each tree, and other like measurements. A forest surveyor will use many different instruments to perform such measurements on the trees and is usually well trained in surveying forests with the instruments. However, it can be costly and time intensive to have a forest surveyor measure every tree in each of the individual plots 102 of the forest survey plot 100.

Figure 2A:
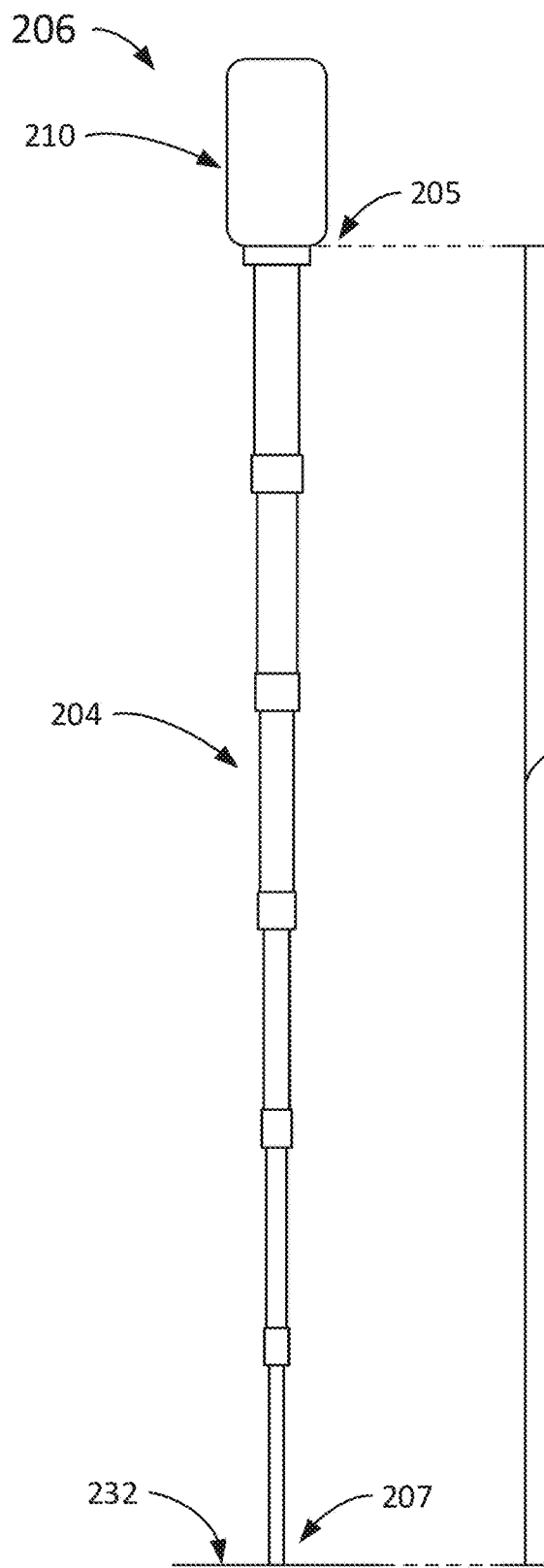
FIG. 2A illustrates a front view of a forest survey device including an imaging device coupled to an extendable rod according to an aspect of the present disclosure.
Figure 2B:
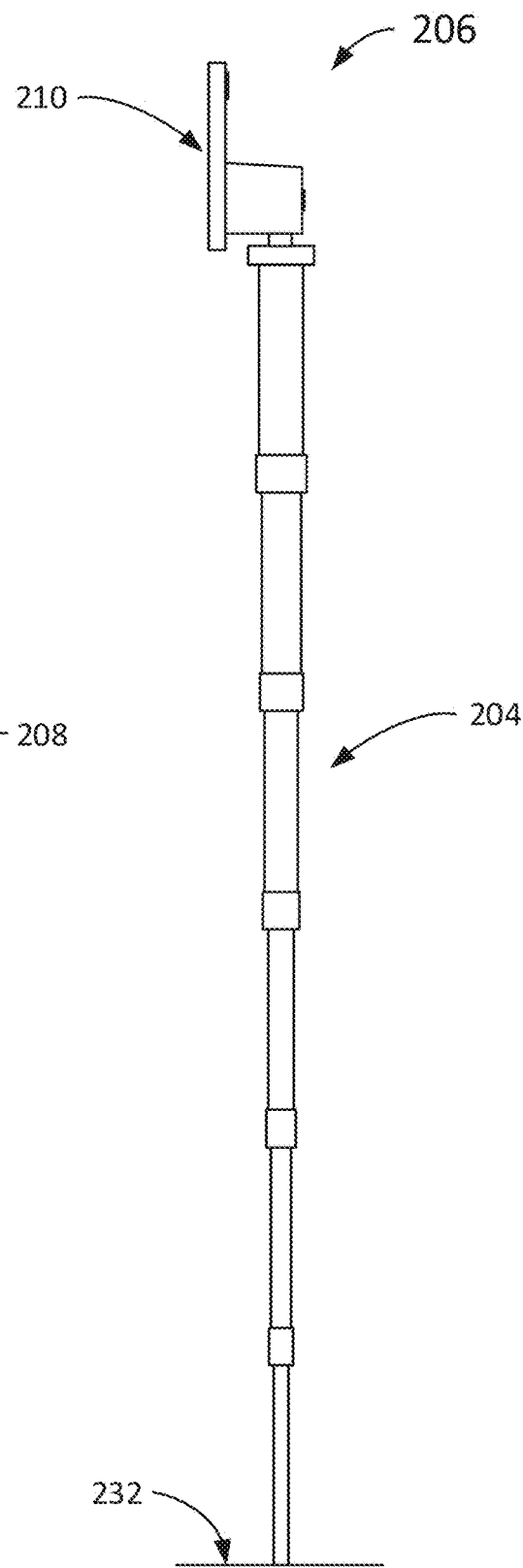
FIG. 2B illustrates a side view of the forest survey device of FIG. 2A including the imaging device coupled to the extendable rod according to an aspect of the present disclosure.

Moving to FIGS. 2A and 2B, FIG. 2A illustrates a front view of a forest survey device 206 including an imaging device 210 coupled to an extendable rod 204 while FIG. 2B illustrates a side view of the forest survey device 206 including the imaging device 210 coupled to the extendable rod 204. In operation, the imaging device 210 is coupled to the extendable rod 204 which bears against a surface 232 (e.g., ground) and has a length 208. The length 208 of the extendable rod 204 is defined as between a top 205 of the extendable rod and a bottom 207 of the extendable rod. The length can be a determined length as is described elsewhere herein. Sensors within the imaging device 210, together with the extendable rod 204 and the determined length, enable the imaging device 210 to know where it is within 3D space. For example, sensors within the imaging device 210 can determine an orientation of the imaging device while it is coupled to the extendable rod 204 with the determined length of the extendable rod 204 being used to determine the pose of the imaging device relative to a surface. The imaging device 210 can capture images of trees in an area, such as in an individual plot 102 within a forest survey plot 100, which can then be used to determine the number of trees and/or characteristics of the trees within the individual plot. Further, the images can be used to locate where the trees are within the 3D space of the individual plot. The forest survey device 206 can replace the multiple instruments that a forest surveyor normally needs to take a forest survey. Additionally, capturing images with an imaging device can be done with relative ease and a specifically trained forest surveyor may not be needed to perform a forest survey with the forest survey device 206.

Figure 3A:
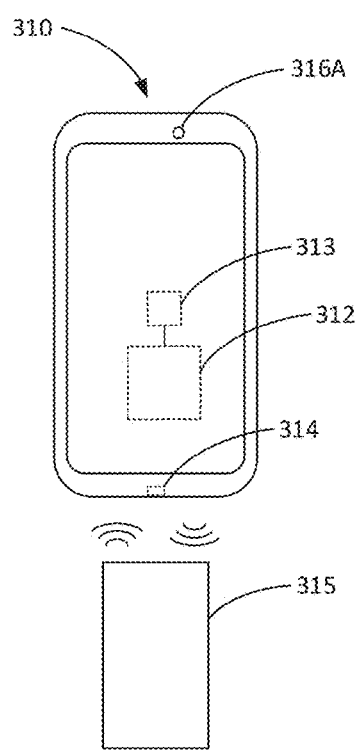
FIG. 3A illustrates a front view of an imaging device according to an aspect of the present disclosure.
Figure 3B:
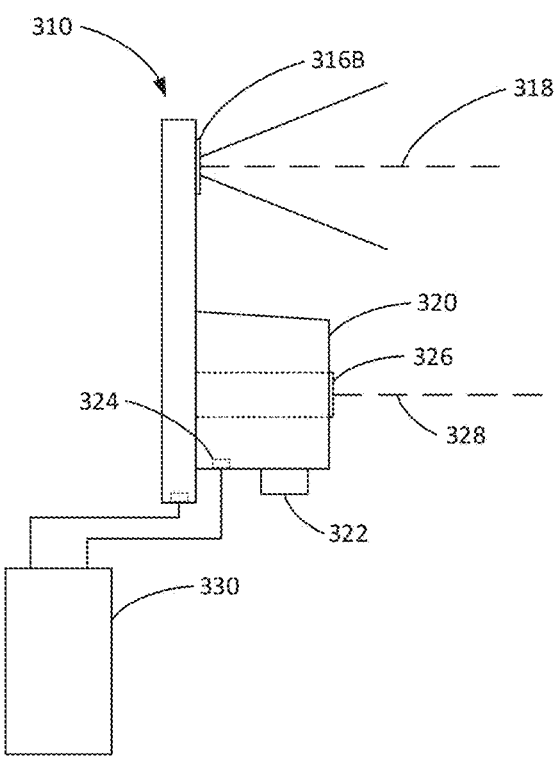
FIG. 3B illustrates a side view of the imaging device of FIG. 3A and a power source according to an aspect of the present disclosure.

Moving to FIGS. 3A and 3B, 3A illustrates a front view of an imaging device 310 according to an aspect of the present disclosure, while FIG. 3B illustrates a side view of the imaging device 310 and an additional power source 330 according to an aspect of the present disclosure. The imaging device 310 includes a processor 312 and one or more sensors 313 which can be in communication with the processor 312. The processor can be any type of processor including, for example, a microprocessor and can be used to execute instructions such as a computer program from memory which can include read/write flash memory. The one or more sensors 313 can be any type of sensor, but are configured to measure a pitch, a roll, and/or a compass bearing of the imaging device. In some embodiments, the one or more sensors 313 include one or more accelerometers which can measure acceleration of the imaging device in any direction. In some embodiments, the one or more sensors 313 include a magnetometer which can measure earth's magnetic field. In some examples, the one or more sensors 313 include a gyroscope. In some embodiments, the one or more sensors 313 include at least one of each of an accelerometer, a magnetometer, and a gyroscope. In some such embodiments, the processor 312 communicates with the accelerometer(s), the magnetometer, and the gyroscope to determine the orientation of the imaging device including the pitch, roll, and compass bearing of the imaging device.

In some embodiments, the one or more sensors of the imaging device can also include a global positioning system (GPS) sensor which can determine the approximate position of the imaging device on Earth. However, while the imaging device can include a GPS sensor inside, in some examples, the imaging device is in communication with a separate GPS sensor 315. A separate GPS sensor, such as the GPS sensor 315, can be more accurate than a GPS sensor which can fit inside of the imaging device 310. For example, in some embodiments, the imaging device includes a GPS sensor which has an accuracy of 10 meters while the external GPS can have an accuracy of less than 1 meter. The imaging device 310 can be in wired or wireless communication with the GPS sensor such that the GPS sensor 315 can determine its location and send the location to the processor 312 of the imaging device 310. The processor 312 can use the location to, for example, help determine where the imaging device 310 is within a forest plot or individual plot inside the forest plot.

The imaging device 310 also includes a front camera 316A, a back camera 316B with a field of view and a centerline, and a charging port 314 which can be used to charge batteries within the imaging 310 device and/or provide power to the imaging device 310. As illustrated in FIG. 3B, the imaging device 310 is electrically connected to the power source 330 via the charging port 314 which can charge and/or power the imaging device 310. In some embodiments, such as the embodiment of FIGS. 3A and 3B, the imaging device 310 is a smartphone device which comprises a display in addition to the processor, the one or more sensors, the front camera, and the back camera, and the charging port. The display can be used to present information to an operator of the imaging device including instructions, as is described elsewhere herein.

In some embodiments, an input device configured to generate audio data is included in the forest survey device. In some such embodiments, the imaging device 310 can include the input device (e.g., a microphone) which can be in communication with the processor 312. The processor 312 can receive and store the audio data, and in some examples, can store the audio data with associated images. For instance, an operator can capture a series of images using the imaging device and record audio notes to the imaging device about the series of images.

In FIG. 3B, the imaging device 310 is coupled to a housing 320 which houses a laser rangefinder 326 having a centerline 328. The laser rangefinder 326 can be used to determine the distance from itself and the housing 320 to an object which the laser of the laser rangefinder 326 hits. The laser rangefinder 326 can include a port 324 which can enable the laser to receive power from a power source such as a battery. While in some examples, the laser can include its own power source, in FIG. 3B, the laser 326 is electrically connected to the power source 330 via the port 324. By including the power source 330, the laser 326 and the imaging device 310 can, in some examples, run for a longer period than if they were running using their own power sources.

Further in FIG. 3B, the housing 320 coupled to the imaging device 310 can include a link 322. The link 322 can be used to couple the imaging device 310 to another object. For example, the link 322 can be used to couple the imaging device 310 to an extendable rod (e.g., 204). In some embodiments, the link 322 is threaded and can receive a threaded insert.

Figure 4:
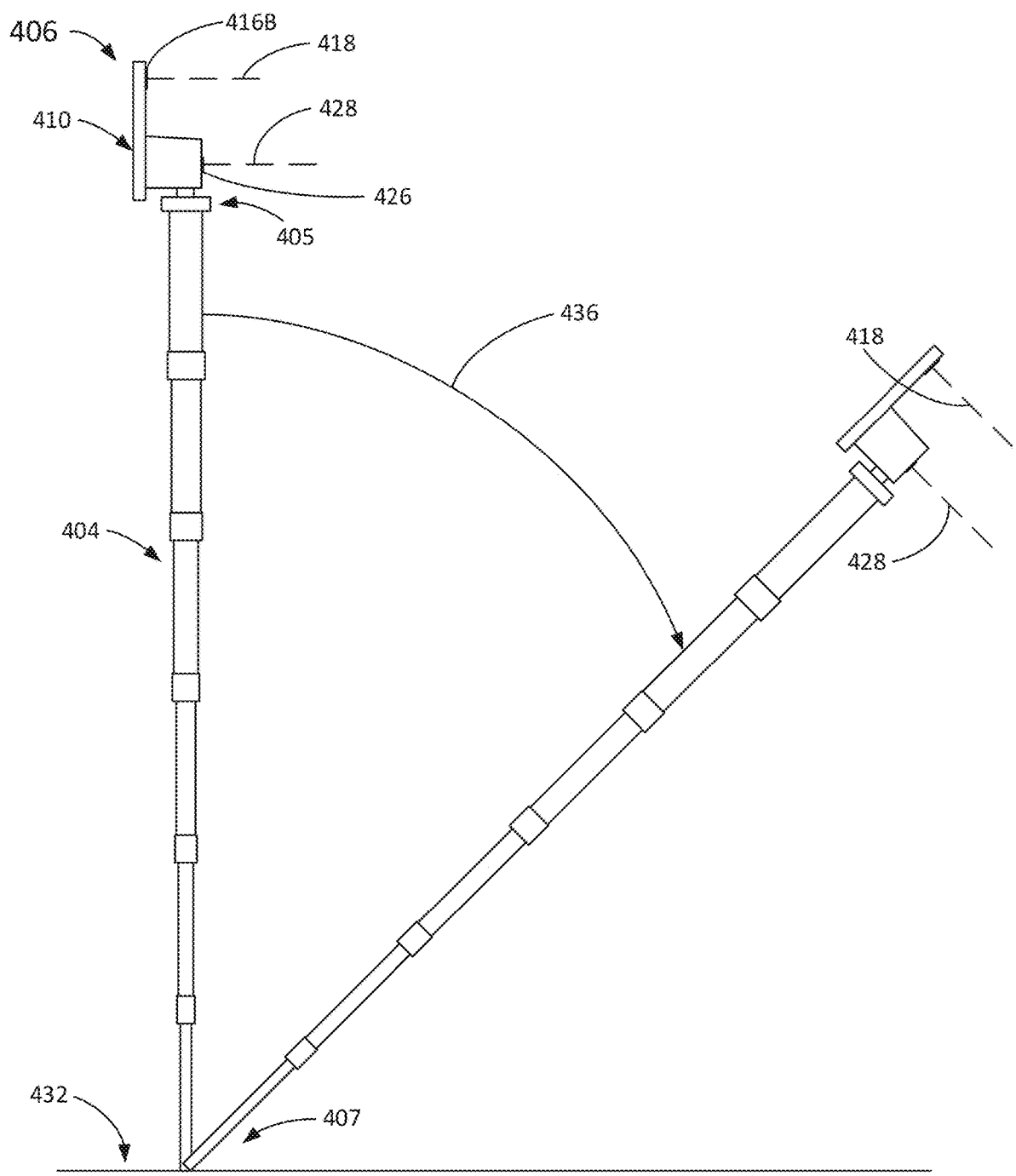
FIG. 4 illustrates a side view of the forest survey device, including the imaging device coupled to the extendable rod, pivoting about a base of the extendable rod according to an aspect of the present disclosure.

Moving to FIG. 4, FIG. 4 illustrates a side view of a forest survey device 406 including an imaging device 410 coupled to an extendable rod 404 according to an aspect of the present disclosure. In FIG. 4, the forest survey device 406 is being calibrated so that a processor of the imaging device 410 can determine the height at which the imaging device 410 is capturing pictures. In calibration, the processor of the imaging device 410 determines the length of the extendable rod 404 as defined from the top 405 of the extendable rod to the bottom 407 of the extendable rod using the one or more sensors of the imaging device. In the illustrated embodiment, the forest survey device 406 bears against a surface 432 with its bottom end 407 and pivots about its bottom end 407 from a vertical position to a forward angled position. As seen by the centerline 418 and 428 respectively, the back camera 416B and the laser rangefinder 426 rotate from approximately parallel to the surface 432 to facing the surface 432 at an angle 436. The amount the forest survey device 406 pivots forward during calibration, and the angle 436, can range from greater than 0° from vertical to less than 90° from vertical. However, in some embodiments, the angle 436 is approximately 45° from vertical.

Figure 5:
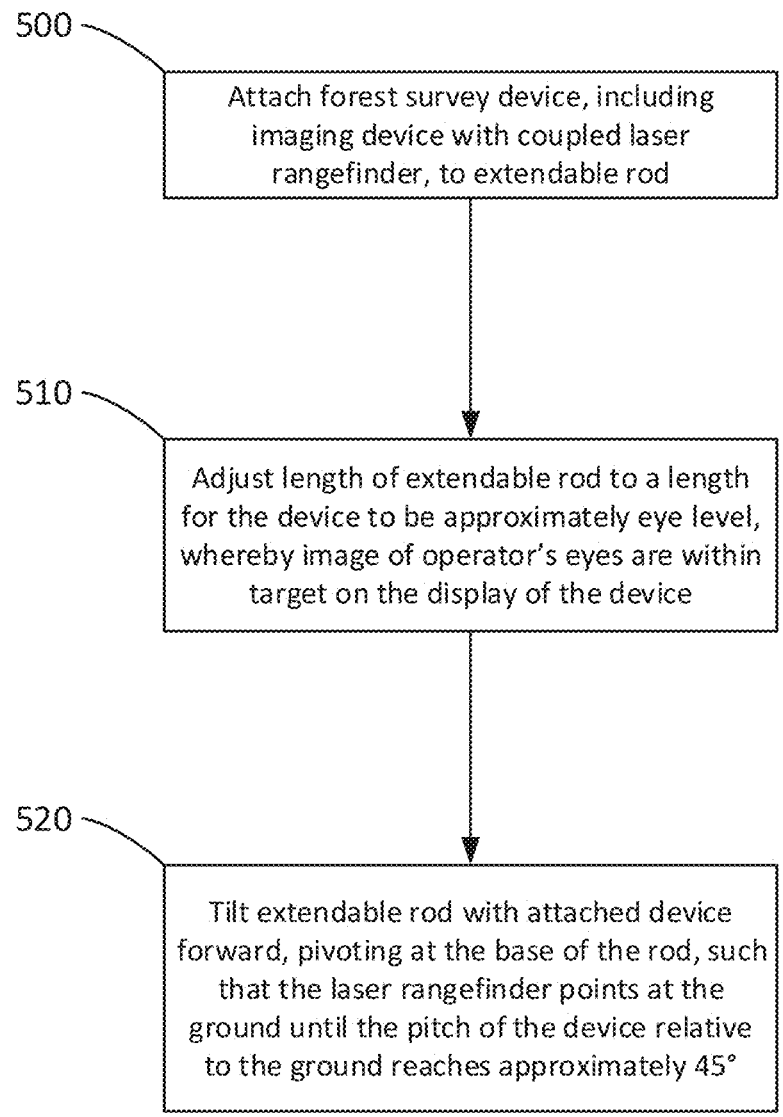
FIG. 5 is a flow diagram of an example method for determining a length of an extendable rod according to an aspect of the present disclosure.

FIG. 5 is a flow diagram of an example method for determining a length of an extendable rod (e.g., 404) according to an aspect of the present disclosure. Starting at step 500, an operator of a forest survey device (e.g., 406) can attach an imaging device and laser rangefinder coupled to the imaging device, to an extendable rod. In some embodiments, the imaging device coupled with the laser rangefinder is screwed onto the extendable rod, but other attaching means are contemplated.

Continuing with step 510, an operator can adjust the length of the extendable rod to a length for the forest survey device, including the imaging device, to be at approximately eye level. In some embodiments, the imaging device of the forest survey device can include a display which can display a target to the operator. The target can provide an indication as to when the imaging device, and thus the forest survey device, is at eye level with the operator. In some embodiments, a front camera (e.g., 316A) of the imaging device provides a live image to the display. The displayed live image can visually aid the operator in aligning their eyes with the imaging device. In some examples, the target is overlaid on the live image so that the operator can align their eyes with the target, by adjusting the length of the extendable rod, and receive live feedback about their alignment from the display. In some examples, to accurately adjust the length of the extendable rod, one or more sensors within the imaging device can determine the pitch and/or the roll of the imaging device relative to the surface. If, for example, the pitch and/or roll of the imaging device are outside of a range, the imaging device can display an alert to the operator. In some examples, if the orientation of the device, which comprises the pitch, the roll, and the compass bearing of the device as measured by the one or more sensors, is outside an acceptable range, the processor of the device can provide an indication to the user that the orientation is inadequate for determining the length of the extendable rod. If, however, the pitch and/or roll of the imaging device are within a range, the operator can interact with the imaging device to initiate calibration of the forest survey device.

Continuing with step 520, after the length of the extendable rod has been adjusted to approximately eye height of the operator, the operator can tilt the entire forest survey device, including the imaging device and rangefinder, forward. The forest survey device, being tilted by the operator, will pivot about its base such that the laser rangefinder and back camera are generally directed toward the surface. In some examples, the operator can tilt the extendable rod until the angle is approximately 45° or greater. While 45° or greater is desirable, the forest survey device can be tilted any number of degrees between greater than 0° and less than 90° from vertical for calibration. In some examples, the display of the imaging device can display to the operator the approximate angle of the forest survey device relative to the surface using the one or more sensors. Once the extendable rod has been tilted 45° or greater, the operator can interact with the imaging device (e.g., touch a button on the display) and finish calibration of the forest survey device. In some examples, the forest survey device automatically finishes calibration once the one or more sensors determine the forest survey device has tilted 45° or greater.

During the calibration of the forest surveying device, the processor of the imaging device can receive image data from the imaging device, distance information from the laser rangefinder to the surface, as well as measurements from the one or more sensors. The measurements from the one or more sensors can include the pitch, roll, and/or compass bearing of the imaging device and together can comprise the orientation of the imaging device. In this disclosure, referring to the orientation of the forest survey device is the same as referring to the orientation of the imaging device as the imaging device is a part of the forest survey device. The processor, using the orientation of the imaging device and the distance from the imaging device to the surface, can further use trigonometry to calculate the length of the extendable rod. In some examples, the processor determines the length of the extendable rod repeatedly as the extendable rod is pivoted about its base and further analyzes the many determined lengths to calculate a best approximation for the length of the extendable rod. For example, in some embodiments, the processor can receive second image data from the imaging device, a second distance from the laser rangefinder to the surface, and second measurements from the one or more sensors. The second measurements can together make up a second orientation of the imaging device. The processor can then determine the length of the rod using the second orientation of the extendable rod relative to the surface and the second distance to the surface in addition to the first orientation of the extendable rod and the first distance to the surface.

The processor can use the length of the extendable rod to determine the height at which the imaging device sits relative to a surface, as the length of the coupling of the image device to the extendable rod (e.g., via the housing) can be previously known. By determining an accurate length of the extendable rod, and the height at which the imaging device sits, the processor can "place" the imaging device within 3D space. After the calibration of the forest survey device, the processor has the information about the height, the pitch, the roll, and the compass bearing of the imaging device and the processor can determine the precise position the imaging device when it takes any images. As is described throughout this disclosure, the pose of the forest inventory device, including the pose of the imaging device, includes the orientation of the forest inventory device and its position relative to a surface. For example, a pose of the forest inventory device can include information about the pitch, roll, compass bearing, and height above a surface (e.g., for the imaging device). The pose of the imaging device can be used further as is described elsewhere herein.

While determining the length of an extendable rod has been described, the process can be used for non-extendable rods. Extendable rods, though, are advantageous over non-extendable rods as different operators a forest survey device can be different heights and aligning an imaging device of the forest survey device with different operator's eye levels would be difficult without an extendable rod. Further, aligning the imaging device with an operator's eye level allows the operator to be accurate when capturing pictures using the imaging device. For instance, in some examples, the imaging device needs to be approximately level when capturing pictures of trees as is described elsewhere herein.

Figure 6:
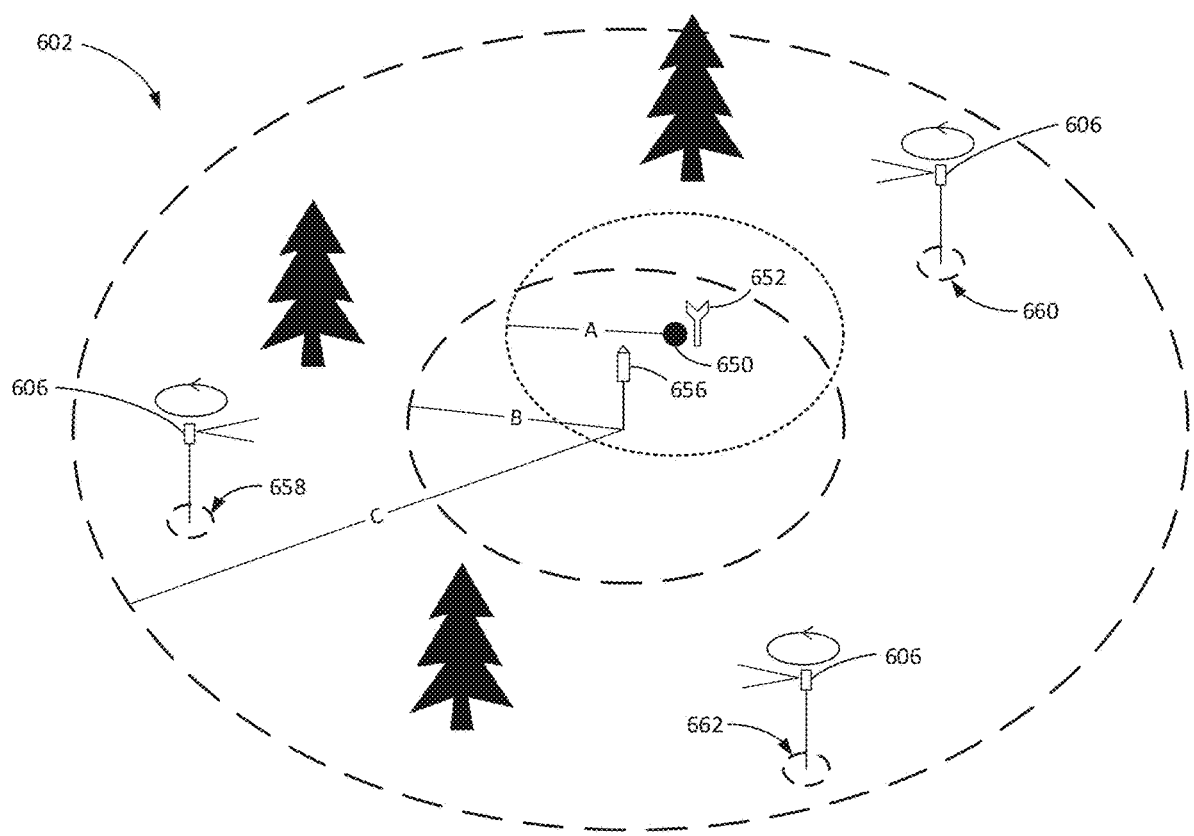
FIG. 6 illustrates a system for surveying a forest plot according to an aspect of the present disclosure.

Moving to FIG. 6, FIG. 6 illustrates a system for surveying an individual forest plot 602 of a forest plot according to an aspect of the present disclosure. The system includes a monument 652 (e.g., a marker), a start stick 656, and a forest survey device 606, though in some examples, only a forest survey device 606 is used. The individual forest plot 602 includes a plot center 650 and in some examples has a plot boundary. To survey the individual forest plot 602, an operator can move the forest survey device 606 about the individual forest plot 602 (e.g., within the boundary) and capture images of the plot at various points. At each point, the forest survey device 606 can capture the relative position of the point and capture a series of images of trees around the point.

As discussed with respect to FIG. 3, the forest survey device 606 includes an imaging device for capturing images and one or more sensors configured to measure at least one of a pitch, a roll, or a compass bearing to determine an orientation of the imaging device. The forest survey device 606 also includes a laser rangefinder which can measure the distance from the forest survey device 606 to a target and a processor. The processor can receive images from the imaging device, orientation measurements from the one or more sensors, and distance measurements from the laser rangefinder. The imaging device, the one or more sensors, and the laser rangefinder can be coupled to an extendable rod, though in some examples, the rod is non-extendable.

Figure 7:
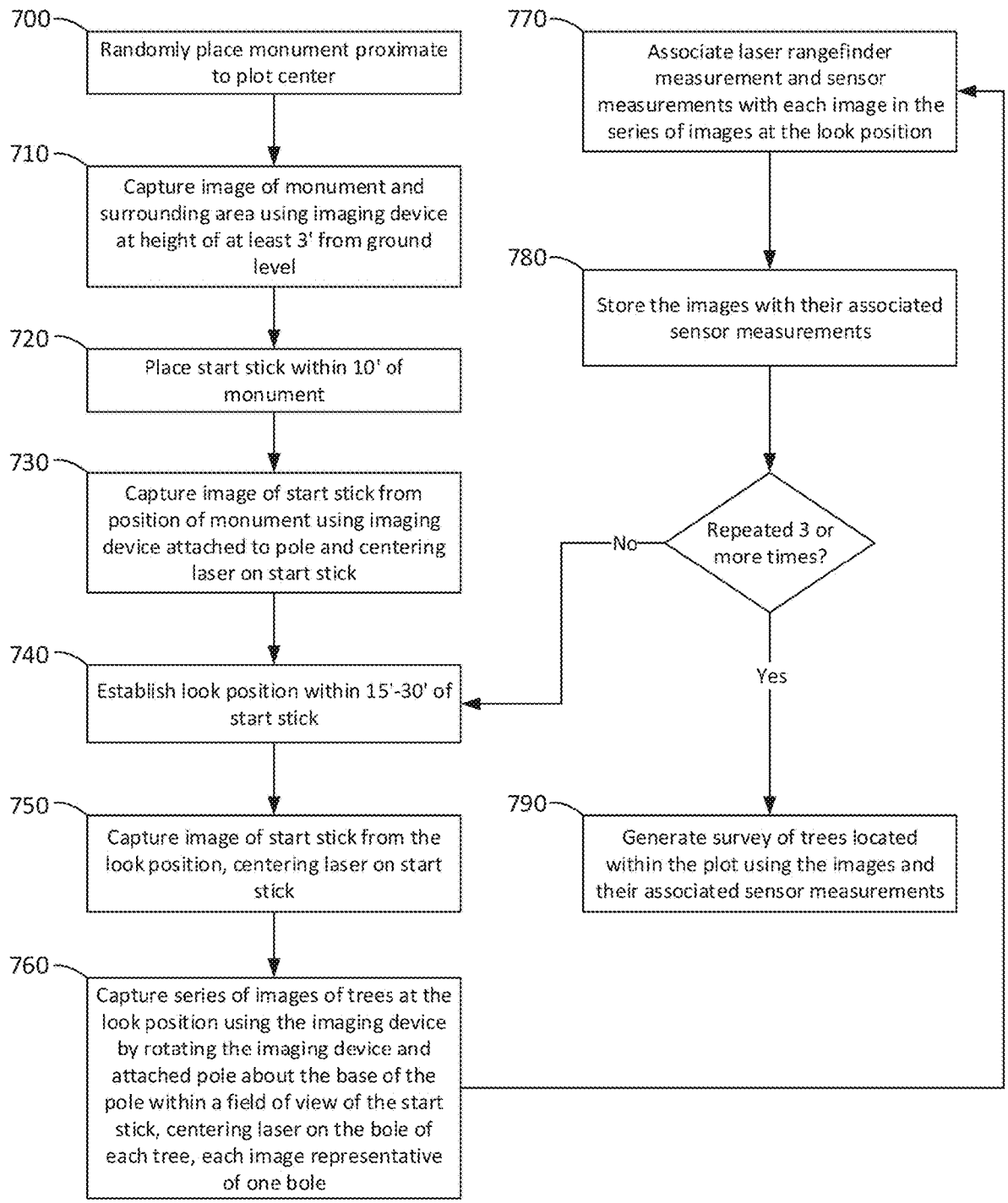
FIG. 7 is a flow diagram of an example method for surveying trees in a forest plot using a forest survey device according to an aspect of the present disclosure.

FIG. 7 is a flow diagram of an example method for surveying trees in a forest plot using the system of FIG. 6. Referring to both FIGS. 6 and 7, at step 700, an operator can randomly place the monument 652 proximate to the plot center 650. The monument 652 can be anything that can indicate the approximate location of the plot center 650. The monument can be used to determine the approximate center of the plot 602 after the plot has been surveyed. It can be desirable to go back to the plot 602 for many reasons including validation of the initial survey and for subsequent surveys. While the plot 602 may have a GPS center, which can be used in some examples, the monument may be necessary to provide an element of randomness. To aid in finding the monument, the monument 652 can be a metallic object, such as a nail, so that a person can later find the monument through any brush with a metal detector. In some examples, the operator can place the monument 652 proximate to the plot center 650 without randomizing the placement.

After placing the monument proximate the plot center, the operator can use the imaging device of the forest survey device 606 to capture an image of the monument and its surrounding area as in step 710. Capturing an image of the area surrounding the monument can provide information about the growth of flora in the area, such as any tree sprouts.

In some examples, the image is taken from at least 3' above ground level which can provide enough information about the flora to predict its future growth. To ensure that the operator captures an image from at least 3' from ground level, the processor of the forest survey device can prevent the image device from capturing an image until the laser rangefinder measures at least 3' from the ground level. In a similar manner, in some examples, the processor in combination with the one or more sensors of the forest survey device can be used to prevent the imaging device from capturing an image of the area surrounding the monument until the imaging device is approximately level with the ground. Having the imaging device approximately level with the ground can increase the quality of the image and increase the quality of flora information captured.

Continuing with the method of FIG. 7, at step 720 an operator can place the start stick 656 within 10' of the monument 652. As illustrated in FIG. 6, "A" approximately represents the 10' surrounding the monument 652 as the monument 652 is proximate the plot center 650. The start stick 656 is a reference point which will be used in subsequent steps for surveying the plot 602. In some examples, the start stick 656 includes an elevated reflective surface (e.g., retroreflector) which can be used with the laser rangefinder of the forest survey device 606 to provide accurate distance information between the forest survey device 606 and the start stick 656. It can be advantageous to place the start stick 656 within the A portion of the plot such that it is not easily obscured by brush or trees because the start stick 656 is used as a reference point.

At step 730, while located at the monument's position 656, the operator can take an image of the start stick 656 from the monument's 652 position using the imaging device of the forest survey device 606 while centering the laser rangefinder on the start stick 656. Centering the laser rangefinder on the start stick 656 enables the laser rangefinder to determine the distance between the start stick 656 and the monument's 652 position. By capturing an image of the start stick 656 from the monument's 652 position and by centering the laser rangefinder on the start stick 656, the location of the start stick 656 relative to the monument's 652 position is captured. In some examples, the pose of the forest survey device is also captured using the one or more sensors of the imaging device. The pose can help determine the location of the start stick 656 relative to the monument's 652 position. In some examples, if the laser rangefinder, when centered on the start stick 656, determines the distance is greater than 10' from the monument's 652 position to the start stick 656, the processor can prevent the imaging device from capturing an image of the start stick 656. This can prevent inconsistent use of the forest survey device 606 and ensures the start stick is within the "A" position of the plot 602.

In some examples, before capturing an image of the start stick as in step 730, an operator can attach the imaging device to the extendable rod and calibrate the imaging device so that the length of the extendable rod is known. The length can be stored and used by the processor of the imaging device to help determine the locations of objects such as the start stick or trees. The length of the extendable rod is used in addition to the orientation of the imaging device, which includes measurements from the one or more sensors (e.g., pitch, roll, compass bearing), to determine the pose of the forest survey device relative to a surface. In some examples, the processor determines the pose of the forest survey device relative to a surface using the measurements from the one or more sensors and the length of the rod.

Continuing with step 740, the operator can establish a first look position 658 between 15' and 30' of the start stick which is illustrated in FIG. 6 as being between boundary "B" and boundary "C". The first look position 658 is the first position at which the forest survey device is placed to capture images of the plot 602 to survey the plot. While the first look position 658 can be anywhere between boundary's B and C, it can be preferable to establish the first look position 658 such that there is line of sight between it and the start stick 656. Further, it can be preferable to establish the first look position 658 to capture clear images of as many trees in the plot as possible.

Once the first look position 658 has been established, the operator can capture an image of the start stick 656 using the forest survey device 606 as in step 750. The image of the start stick 656 is taken from the first look position 658 while keeping the laser of the laser rangefinder centered on the start stick 656. The laser rangefinder can determine the distance from the first look position to the start stick. With the image of the start stick 656 and the distance to the start stick 656, the location of the first look position relative to the start stick can be determined (e.g., via the processor of the forest survey device).

In step 760, the operator can capture a series of images of trees with the forest survey device 606 while at the first look position 658. As illustrated in FIG. 6, when capturing the series of images, the operator can rotate the forest survey device 606 while it is positioned on the ground surface and can capture images using the imaging device. In some examples, the series of images is limited to images captured within a field of view facing the start stick. For instance, in some examples, the series of images is limited to images captured within a 270° field of view of the start stick. In some embodiments in which the series of images is limited to be captured within a specific field of view, the processor can communicate with the imaging device so that the imaging device, and thus the operator, is prevented from capturing images outside of the limited field of view. Preferably, each image of the series of images is centered on a trunk/bole of a tree that is within a limited field of view of the start stick 656. For example, while positioned at the first look position 658, if there are three trees visible within the limited field of view of the start stick 656, the operator takes three images with each image centered on the trunk of a different tree. With each image centered on a tree trunk, the laser rangefinder can determine the distance from the forest survey device to the trunk of the tree.

Referring now to step 770, the forest survey device 606 can associate the measurements from the laser rangefinder and the one or more sensors with each image in the series of images taken at the first look position 658. The measurements of the laser rangefinder and the one or more sensors can be associated with an image as soon as the image is captured by the forest survey device 606 or after the series of images from the look position are all captured. The various measurements associated with each image in the series of images can comprise the distance from the forest survey device 606 to the trunk of the tree, the pitch, the roll, the compass bearing (e.g., the orientation) of the forest survey device and the height (e.g., length of rod) of the forest survey device 606 relative to the surface, at the time each image was captured. By capturing such measurements while capturing an image of the tree, the location of the tree relative to the first look position 658 can be determined. In some examples, the processor of the forest survey device 606 associates the measurements of the laser rangefinder and the one or more sensors with each image captured.

In some examples, the orientation of the forest survey device, which comprises the pitch, the roll, and the compass bearing of the forest survey device, is represented by a rotation matrix. The rotation matrix can describe the orientation of the forest survey device, including the imaging device, within three-dimensional space. In some examples, the rotation matrix can be determined by the one or more processors of the forest survey device whenever the forest survey device captures an image. The one or more processors can further be configured to embed the rotation matrix into each image so that the images include information about the orientation of the device that captured the images. This can be advantageous as the images can be stored for later use. For example, the images can be used by an external processor to determine the precise location of each tree in a scene.

Once the measurements are associated with each image in the series of images captured at the first look position, the images, with their associated measurements, are stored as in step 780. In some examples, directly after an image is captured, the processor of the forest survey device can associate the measurements and store the image in memory. To store the images and their associated measurements, the forest survey device 606 can include a non-volatile electronic storage medium, for instance, flash memory. Other types of electronic storage are contemplated.

With images and measurements only captured at a first look position 658, the location of the trees within the plot 602 may not be very accurate and the number of trees within the plot 602 may not be correct. To increase accuracy, the forest survey device 606 can be moved to more look positions. For example, as shown in FIG. 6, the forest survey device 606 can be moved to a second look position 660 and a third look position 662 in order to capture more trees in the plot and to be more accurate in determining the location of trees within the plot 602. While using two look positions can be effective, adding a third look position can increase the accuracy and further look positions can increase the accuracy even further. In some examples, the method of FIG. 7 includes the decision of determining if the process of establishing a look position and capturing images from the look position, as well as the subsequent steps, has been repeated 3 or more times. Using three look positions can be advantageous as with three viewpoints, the location of trees within the plot can be triangulated. Thus, in the example of FIG. 7, if the forest survey device captured images from fewer than 3 look positions, the process can repeat with step 740 whereby another look position is established within 15'-30' of the start stick.

In the repeated step of step 740, an operator can establish a second look position 660 within 15'-30' of the start stick. While the second look position can be located anywhere within 15'-30' of the start stick, in some examples, the second look position is located approximately opposite the first look position when referencing the start stick. For example, in FIG. 6, the second look position 660 is located approximately 15'-30' away from the start stick and 30'-60' away from the first look position 658, with a straight line between the first look position 658 and the second look position 660 passing approximately through the start stick position. By having the second look position approximately opposite the first look position, the plot can be more accurately surveyed as trees which may not be visible from the first look position may be visible in the second look position and trees which are visible in both positions can have their location determined relative to both.

In the repeated step 750, an operator can take an image of the start stick 656 from the second look position 660 while centering the laser on the start stick 656. This step can allow the processor, for example, to determine the location of the second look position relative to the start stick. The operator can then take another series of images of trees at the second look position using the forest survey device by rotating the device about its base. The distance measurements and one or more sensor measurements can be associated with each image in the series of images and the images, with their associated measurements, can be stored as in steps 770 and 780. In some examples, the method can be finished after two look positions. However, in some embodiments such as the one illustrated and described in FIG. 6 and FIG. 7, a third look position is used.

Again, the operator can establish a third look position 662 within 15'-30' of the start stick 656. In some embodiments, the third look position is established approximately between the first look position and the second look position. For example, in FIG. 6, the third look position 662 is approximately orthogonal to an imaginary line between the first look position 658 and the second look position 660. By establishing the third look position approximately between the first look position and the second look position, the location of trees within the plot can be triangulated as the trees may be seen from all three look positions. Additionally, the third look position can increase the number of trees surveyed within the plot as some trees may be obscured from the other look positions. The process of capturing a series of images of trees within a field of view and associating and storing measurements with each image within the series of images can again be repeated in the third look position. Adding more look positions can increase the accuracy of the survey of the plot (e.g., accuracy in the number of trees), however, adding more look positions and capturing more images takes more time. As a single forest plot can include many individual plots, using three look positions can optimize the time spent making the survey and the accuracy of the survey.

Continuing with the embodiment of FIG. 7, after surveying the plot 602 from the three look positions, the method can continue with generating a survey of trees located within the plot using the series of images captured at the look positions and the associated sensor measurements. In some examples, this process can be performed by the processor of the forest survey device. However, in some examples, this process is performed by another processor such as a remote processor. In some such examples, the imaging device of the forest survey device can communicate the series of images and their associated sensor measurements to the remote processor (e.g., via a cable or internet).

In general, generating the survey of the plot (e.g., 602) includes using the images captured by the forest survey device, the distances measured by the laser rangefinder, and the pose of the forest survey device, as measured by the one or more sensors, to determine the location of each tree within the plot. Specifically, in some examples, a look position location can be determined by measuring the distance from the look position to the start stick and by using the one or more sensors to measure a compass bearing of the forest survey device as the laser rangefinder is centered on the start stick. The distance and direction from the start stick to the first look position is then known and so the location of the first look position is also known, relative to the start stick. This same process can be used to determine the location of trees relative to the first look position. However, by moving to the second and third look positions, a tree can be imaged from multiple look positions. In such a case, the distances to the tree from each look position, in which the tree is visible, and the measured compass bearing when measuring the distances can be used to determine the location of the tree relative to multiple look positions. This can be more accurate than a location measured relative to a single look position. In some examples, the one or more sensors which can measure the pitch and/or roll of the forest survey device may also be used to increase accuracy of tree locations. For instance, if the pitch of the forest survey device is above or below 0° from level when measuring distance using the laser rangefinder, the distance to/from each tree will be slightly different than if the forest survey device was exactly level.

In some embodiments, each of the look positions reference the start stick to determine their location and each of the trees reference the look positions. Thus, in some such embodiments, the determined location of each of the trees is relative to the start stick. However, to ensure that the locations of each of the trees can be adjusted by an amount equal to the offset between the start stick and the monument. For example, if the start stick is located 5' directly southward of the monument, each of the tree's locations can be adjusted to be 5' directly northward to position them properly within the plot.

The process of determining the location of each tree within an individual plot can be extrapolated to every individual plot within a forest survey plot to help determine characteristics of the forest within the forest survey plot. Additionally, the number of trees, species of the trees, and other characteristics of the trees in each individual plot, as captured in the series of images taken at each look position, can be extrapolated to the forest survey plot to help determine characteristics of the forest within the forest survey plot. In comparison to existing systems and methods, the work of determining the species of each tree, the DBH of each tree, the number of trees, and other characteristics of the trees can be done externally to the forest instead of internally by a highly trained forest surveyor. Further, the time-consuming work of going into a forest and performing the measurements can be reduced by using the forest survey device which can quickly image trees in an area.

Figure 8:
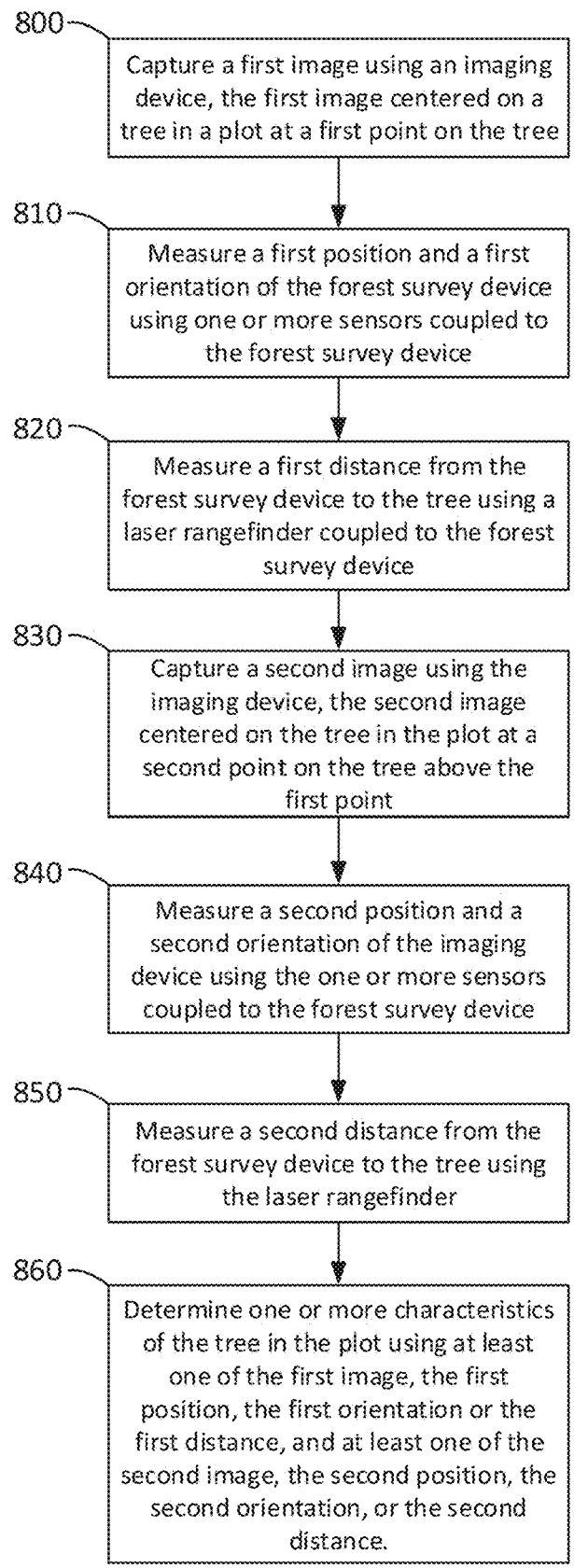
FIG. 8 is a flow diagram of an example method for determining characteristics of a tree within a forest plot according to an aspect of the present disclosure.

Moving to FIG. 8, FIG. 8 is a flow diagram of an example method for determining characteristics of a tree within a forest plot according to an aspect of the present disclosure. The method includes using a forest survey device which comprises an imaging device, a laser rangefinder, and one or more sensors configured to measure the orientation of the forest survey device. In step 800, an operator of the forest survey device can use an imaging device of the forest survey device to capture a first image which is centered on a tree in a plot at a first point on the tree. The image can include more than the tree the image is centered on. In step 810, the operator can measure a first position and a first orientation of the forest survey device using one or more sensors. In step 820, the operator can measure a first distance from the forest survey device to the tree using the laser rangefinder. The first position, the first orientation, and the first distance can be the position, orientation, and distance at which the imaging device captures the first image when used by the operator. For instance, in some examples, the steps of 800, 810, and 820 happen almost simultaneously. Continuing with step 830, an operator can capture a second image using the imaging device which is centered on the tree in the plot at a second point on the tree above the first point. In step 840, the operator can measure a second point and a second orientation of the forest survey device using the one or more sensors. In step 850, the operator can measure a second distance from the forest survey device to the tree using the laser rangefinder. The second position, the second orientation, and the second distance can be the position, orientation, and distance at which the imaging device captures the second image when used by the operator. For instance, in some examples, the steps of 830, 840, and 850 happen almost simultaneously.

Finally, in step 860, the operator can determine one or more characteristics of the tree in the plot, and possibly characteristics of one or more trees which are also in the first image and second image, using at least one of the first image, the first position, the first orientation, or the first distance, and at least one of the second image, the second position, the second orientation, or the second distance. The characteristics can include the location of the tree in the plot, the species of the tree, the height of the tree, the diameter of the tree at breast height (DBH), the biomass of the tree and other characteristics. In some examples, the operator can store the measurements, for instance in a computer readable medium (e.g., flash memory) of the imaging device, to be used later to determine characteristics of the tree.

For instance, in some examples of the method of FIG. 8, the height of the tree can be determined. In some such examples, the diameter of the tree can be determined using the first image and the first distance to the first spot on the tree. The distance between the two edges of the trunk of the tree in the first image combined with the first distance to the trunk can be used to determine the diameter of the tree at the first spot. In a similar manner, the diameter of the trunk of the tree at the second spot can be determined. The distance between the two edges of the trunk of the tree in the second image and the second distance to the second spot on the tree can be used to determine the diameter of the tree at the second spot. The height of the tree can then be determined by determining the distance between the first point and the second point and using the first diameter and the second diameter at the first point and the second point respectively, to extrapolate the distance to the top of the tree. In some embodiments, a processor can be used to perform the steps to determine the height of the tree after an operator has collected the images, distances, orientations, and positions related to the tree.

Figure 9:
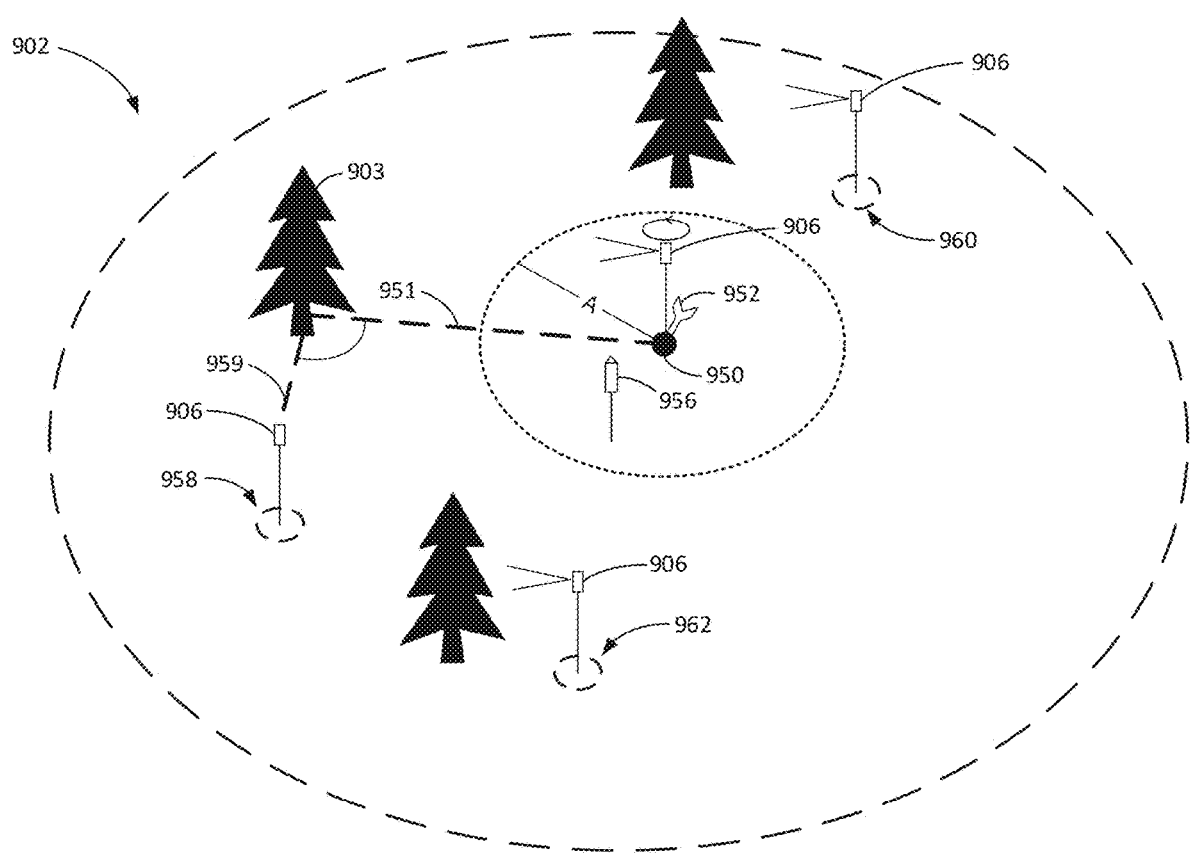
FIG. 9 illustrates another embodiment of a system for surveying a forest plot according to an aspect of the present disclosure.

Moving to FIG. 9, FIG. 9 illustrates another embodiment of a system for surveying a forest plot according to an aspect of the present disclosure. The system includes a monument 952 located at a monument position which lies within the plot 902. They system also includes a start stick 956 and a forest survey device 906. The individual forest plot 902 includes a plot center 950 with the monument 952 and monument position located proximate the plot center 902. To survey the individual forest plot 902, an operator can move the forest survey device 906 about the plot and capture images of the plot at various points using the forest survey device 906. At each point, the forest survey device 906 can capture the relative position of the point and an image of a tree at the point.

As discussed elsewhere herein, the forest survey device 906 can include an imaging device for capturing images, one or more sensors configured to measure a pitch, a roll, and/or a compass bearing, and a laser rangefinder which can measure the distance from the forest survey device 906 to a target. The forest survey device 906 can also include one or more processors configured to receive images, sensor readings, and distance measurements from the various instruments of the forest survey device 906 and can, in some examples, perform calculations.

Figure 10:
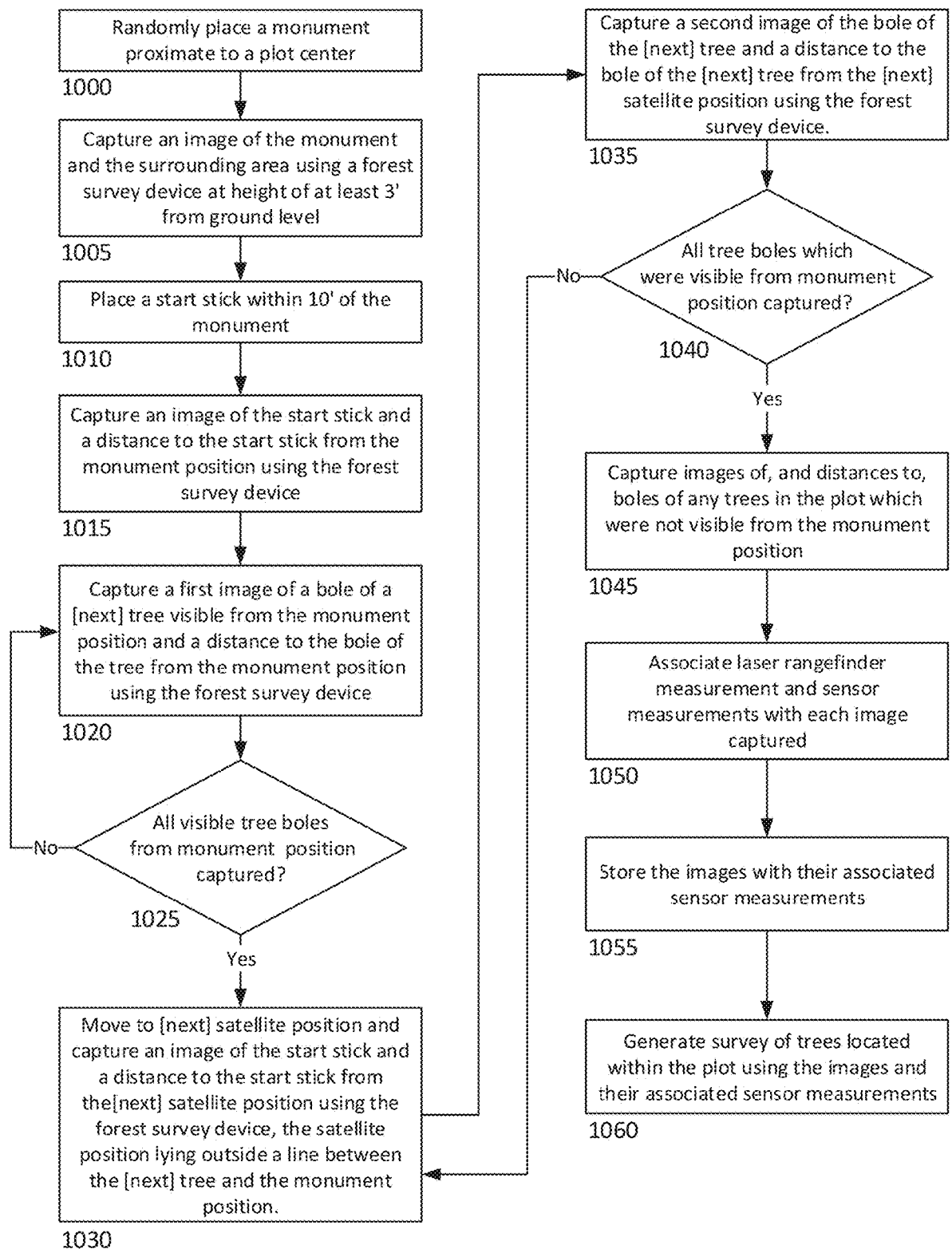
FIG. 10 is a flow diagram of another example method for surveying trees in a forest plot using a forest survey device according to an aspect of the present disclosure.

FIG. 10 is a flow diagram of an example method of surveying trees in a forest plot using the system of FIG. 9. Referring to both FIGS. 9 and 10, at step 1000, an operator can randomly place the monument 952 proximate the plot center 950. After placing the monument proximate the plot center, the operator can use the imaging device of the forest survey device 906 to capture an image of the monument and its surrounding area as in step 1005. Further, in step 1010, an operator can place the start stick 956 within 10' of the monument 952. As illustrated in FIG. 9, "A" approximately represents the 10' surrounding the monument 952 with the monument 952 being proximate the plot center 950. The start stick 956 is a reference point which can be used in subsequent steps for surveying the plot 902. In some examples, the start stick 956 includes an elevated reflective surface (e.g., retroreflector) which can be used with the laser rangefinder of the forest survey device 906 to provide accurate distance information between the forest survey device 906 and the start stick 956. It can be advantageous to place the start stick 956 within the "A" portion of the plot such that it is not easily obscured by brush or trees because the start stick 956 is used as a reference point.

At step 1015, while located at the monument's position 956, the operator can take an image of the start stick 956 from the monument's 952 position using the imaging device of the forest survey device 906 while centering the laser rangefinder on the start stick 956. Centering the laser rangefinder on the start stick 956 enables the laser rangefinder to determine the distance between the start stick 956 and the monument's 952 position. By capturing an image of the start stick 956 from the monument's 952 position and by centering the laser rangefinder on the start stick 956, the start stick's 956 location relative to the monument's 952 position can be determined. In some examples, the pose of the forest survey device is also captured using the one or more sensors of the imaging device. The pose can help determine the location of the start stick 956 relative to the monument's 952 position. In some examples, if the laser rangefinder, when centered on the start stick 956, determines the distance is greater than 10' from the monument's 952 position to the start stick 956, the processor can prevent the imaging device, and thus the operator, from capturing an image of the start stick 956. This can prevent inconsistent use of the forest survey device 906 and ensures the start stick is within the "A" position of the plot 902.

In some examples, before capturing an image of the start stick as in step 1015, an operator can attach the imaging device to the extendable rod and calibrate the imaging device so that the length of the extendable rod is known. The length can be stored and used by the processor of the imaging device to help determine the locations of objects such as the start stick or trees. In some examples, the length of the extendable rod is used in addition to the measurements from the one or more sensors to determine the pose of the forest survey device.

Continuing with step 1020, the operator can capture a first image of a bole of a tree visible from the monument position 952 using the imaging device of the forest survey device. The operator can further capture the distance from the forest survey device 902 to the bole of the tree using the laser rangefinder of the forest survey device. In some examples, the operator can center the laser rangefinder of the forest survey device 902 on the bole of the tree and can capture the first image of the bole of the tree and the distance to the bole of the tree at the same time. The processor of the forest survey device can then receive and store both the first image of the bole of the tree and the distance measurement at the same time as is discussed elsewhere herein.

After capturing the first image of the bole of the tree visible from the monument position, the process can continue with step 1025. At 1025, the operator can determine if all the visible tree boles from the monument position have been captured. If that is not the case, the operator can return to step 1020 for each tree visible from the monument position. The operator can thus capture a series of images from the monument position with each image in the series of images including a bole of a different tree within the plot. For example, if the operator can see five tree boles from the monument position, the operator captures an image of each of the five tree boles with each image including a tree bole. In some examples, only tree boles which are visible from the monument and within the plot are captured. In some examples, the operator can capture images, and their associated distance measurements, of each tree visible from the monument position using the imaging device without constantly checking if all the visible tree boles have been captured. Once all the tree boles visible from the monument position have been captured, the process can continue with step 1030.

In step 1030, the operator can move to a satellite position (e.g., 958, 960, 962) and capture an image of the start stick 956 and a distance to the start stick 956 from the satellite position (e.g., 958, 960, 962). By capturing an image of the start stick 956, the position of the satellite position relative to the start stick 956 can be determined. A satellite position can correspond to a position at which an operator can capture a second image of the bole of a tree which was already captured from the monument position. In some examples, each satellite position can correspond to a single tree. In some examples, such as the embodiment of FIGS. 9 and 10, a satellite position for a given tree lies outside a line between the monument position 952 and the tree. For example, as illustrated in FIG. 9, an operator can capture an image of the bole of a tree 903 and the distance to the bole of the tree 903 from the monument position 952. The line 951 illustrates a straight line between the monument position 952 and the bole of the tree 903 which corresponds to the angle the image of the tree is captured from the monument position. The operator can then move to a satellite position 958 which lies outside of the line 951.

In step 1035, the operator can capture a second image of the bole of the tree 903 and a distance to the bole of the tree 903 using the forest survey device from the satellite position 958. Capturing an image and distance from the satellite position can provide a different angle/perspective of the bole of the tree 903 than the image captured from the monument position shown by the line 959. By capturing an image of the bole of the tree 903 from a different angle, the position of the tree can be triangulated. For example, in FIG. 9 the line 959 illustrates the view of the forest survey device to the tree 903 from the satellite position 958. In some examples, the processor of the forest survey device can prevent capturing an image and distance to the bole of a tree. For example, if an operator attempts to move to a satellite position which lies between the tree and the monument position, the processor can prevent the forest survey device from capturing an image and can alert (e.g., via a display) to the operator that they need to relocate to a different position. Further, in some examples, the processor can require the angle of the satellite position to the bole of the tree relative to the angle of the monument position to the bole of the tree to be greater than a specified angle (e.g., 15 degrees). For example, in FIG. 9, the angle between line 951 and line 959 is greater than 15 degrees. In some examples, the satellite position lies in a line approximately orthogonal to the line between the corresponding tree captured from the monument position and the monument position. For example, with reference to FIG. 9, line 959 can be orthogonal to line 951. Preventing the operator from capturing an image from a position which lies in line with, or within a specified angle of, the line between the monument position and the bole of the tree, can ensure an accurate triangulation of the tree.

Continuing with step 1040 of FIG. 10, the operator can determine if all tree boles which were visible from the monument position have been captured from a satellite position. If not, the process goes back to step 1030 whereby the operator moves to another satellite position to capture an image of any remaining trees. If all the tree boles have been captured, then the process can continue with step 1045. In step 1045, the operator can use the forest survey device to capture images of, and distances to, the boles of any trees in the plot which were not visible from the monument position. Step 1045 ensures that every tree in the plot is captured at least once.

Whenever the forest survey device captures an image using the imaging device and/or measures a distance using the laser rangefinder, the one or more sensors of the forest survey device can simultaneously capture the pitch, roll, and/or compass bearing of the forest survey device. The processor of the forest survey device can associate the laser rangefinder distance measurements and the sensor measurements with each image captured by the forest survey device as in step 1050. In step 1055 and then step 1060, the processor can store the images with their associated sensor measurements, including distance measurements, and can generate a survey of tress located within the plot using the images and their associated sensor measurements. In some examples, the stored images with their associated sensor measurements are used to generate a survey of trees within the plot by a processor which is not part of the forest survey device. For example, in some such embodiments, the forest survey device can store the images with their associated sensor measurements and can transfer the stored images and associated sensor measurements to another processor which generates the survey of trees.

While the steps of FIG. 10 are described as being in a specific order, the process need not follow the order described with respect to FIG. 10. Further, one or more steps may be performed substantially simultaneously. For example, in some embodiments, steps 1050 and 1055 occur after every image is captured such that each image captured is stored with associated sensor measurements. A person having ordinary skill in the art will understand that the flowchart of FIG. 10 is one embodiment, and that this disclosure is not limited to the embodiment of FIG. 10.

Various embodiments have been described. Such examples are non-limiting, and do not define or limit the scope of the invention in any way.

The invention claimed is:

1. A system for surveying trees within in a plot, the plot including a series of positions including a monument position, a start stick position, and at least one satellite position, the system comprising:
   an imaging device configured to capture images of a scene;
   one or more sensors couplable to the imaging device and configured to measure at least one of a pitch, a roll, or a compass bearing and used to determine a pose of the imaging device relative to a surface;
   one or more processors configured to:
      receive an image of the start stick from the imaging device, the image including the start stick from the monument position;
      receive a first series of images, the first series of images being captured from the monument position, each image in the first series of images including the bole of a different tree within the plot;
      receive, for each bole of a tree included in the first series of images:
         a first image captured from a satellite position, the first image including the start stick; and
         a second image captured from the satellite position, the second image including the bole of a corresponding tree included in the first series of images, the satellite position lying outside of a line between the corresponding tree included in the first series of images and the monument position;
      associate one or more sensor measurements with the image of the start stick, the first series of images, and the first and second images captured from the satellite position, the one or more sensor measurements comprising the pose of the imaging device when the imaging device generates images of the scene;
      store the image of the start stick, the first series of images, and the first and second images captured from the satellite position, with their associated one or more sensor measurements in a computer readable storage medium; and
      generate a survey of trees in the plot using the image of the start stick, the first series of images, the first and second images captured from the satellite position, and their one or more associated sensor measurements.

2. The system of claim 1, wherein the one or more processors is further configured to determine a rotation matrix of the imaging device using the one or more sensors configured to measure at least one of a pitch, a roll, or a compass bearing, when the one or more processors receive an image from the imaging device.

3. The system of claim 2, wherein the one or more processors is further configured to embed the rotation matrix into the image received from the imaging device.

4. The system of claim 1, wherein the processor is further configured to prevent capturing the first image from the satellite position if the satellite position lies within 15 degrees of the line between the corresponding tree included in the first series of images and the monument position.

5. The system of claim 1, wherein for each bole of a tree included in the first series of images, the satellite position from which the second image is captured lies in a line approximately orthogonal to the line between the corresponding tree included in the first series of images and the monument position.

6. The system of claim 1, wherein the start stick position is within 10' of the monument position.

7. The system of claim 1, further comprising an input device, the input device configured to generate audio data, wherein the one or more processors is further configured to store the audio data with at least one of the first series of images, the first image captured from a satellite position, or the second image captured from the satellite position.

8. The system of claim 1, further comprising a laser rangefinder configured to measure a distance to a target.

9. The system of claim 8, wherein:
for each image captured by the imaging device, the laser rangefinder measures the distance to the target;
the one or more processors is configured to associate the distance to the target with each image captured by the imaging device; and wherein
the one or more processors is configured to generate the survey of trees in the plot using the associated distance to the target for each image captured by the imaging device.

* * * * *